United States Patent
Shimizu

(10) Patent No.: US 12,288,847 B2
(45) Date of Patent: Apr. 29, 2025

(54) NONAQUEOUS ELECTROLYTE SECONDARY BATTERY AND BATTERY MODULE

(71) Applicant: Prime Planet Energy & Solutions, Inc., Tokyo (JP)

(72) Inventor: Yuto Shimizu, Himeji (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 504 days.

(21) Appl. No.: 17/726,462

(22) Filed: Apr. 21, 2022

(65) Prior Publication Data

US 2022/0344717 A1    Oct. 27, 2022

(30) Foreign Application Priority Data

Apr. 26, 2021  (JP) ................. 2021-073928

(51) Int. Cl.
*H01M 10/0569* (2010.01)
*H01M 10/04* (2006.01)
(Continued)

(52) U.S. Cl.
CPC ... *H01M 10/0569* (2013.01); *H01M 10/0468* (2013.01); *H01M 10/0525* (2013.01);
(Continued)

(58) Field of Classification Search
CPC ........... H01M 10/0569; H01M 50/457; H01M 50/411; H01M 10/0468; H01M 10/0525;
(Continued)

(56) References Cited

U.S. PATENT DOCUMENTS 10,741,815 B2 *  8/2020  Arise ............. H01M 50/489
2009/0280407 A1  11/2009  Ito et al.
(Continued)

FOREIGN PATENT DOCUMENTS

CN   104362276 B   4/2018
JP   201987523 A   6/2019
(Continued)

OTHER PUBLICATIONS

JPO to grant a Patent for Application No. 2021073928 (Year: 2023).*

*Primary Examiner* — Alexander Usyatinsky
(74) *Attorney, Agent, or Firm* — HAUPTMAN HAM, LLP

(57) ABSTRACT

A nonaqueous electrolyte secondary battery includes an electrode assembly and an electrolyte solution. The electrode assembly includes a laminated assembly. The laminated assembly includes a positive electrode plate, a negative electrode plate, and a separator. The separator separates the positive electrode plate and the negative electrode plate from each other. The separator includes a porous resin layer. The porous resin layer includes a polyolefin-based material. The negative electrode plate includes a negative electrode active material layer. The negative electrode active material layer includes negative electrode active material particles. The negative electrode active material layer is in direct contact with the porous resin layer. The negative electrode active material layer has a puncture resistance of more than or equal to 0.60 N/mm.

12 Claims, 9 Drawing Sheets

(51) Int. Cl.
  *H01M 10/0525* (2010.01)
  *H01M 10/0567* (2010.01)
  *H01M 50/411* (2021.01)
  *H01M 50/457* (2021.01)
  *H01M 4/02* (2006.01)

(52) U.S. Cl.
  CPC ..... *H01M 10/0567* (2013.01); *H01M 50/411* (2021.01); *H01M 50/457* (2021.01); *H01M 2004/021* (2013.01); *H01M 2300/0028* (2013.01)

(58) Field of Classification Search
  CPC ....... H01M 10/0567; H01M 2004/021; H01M 2300/0028
  See application file for complete search history.

(56) References Cited

U.S. PATENT DOCUMENTS

| | | | |
|---|---|---|---|
| 2009/0291370 A1* | 11/2009 | Kim | H01M 10/4235 429/338 |
| 2016/0285100 A1* | 9/2016 | Tanizaki | H01M 4/131 |
| 2016/0365559 A1* | 12/2016 | Yoshimaru | H01M 50/417 |
| 2018/0097223 A1 | 4/2018 | Saito et al. | |
| 2018/0294510 A1* | 10/2018 | Kitaura | H01M 10/647 |
| 2019/0157647 A1* | 5/2019 | Kidosaki | B32B 27/32 |

FOREIGN PATENT DOCUMENTS

| | | |
|---|---|---|
| KR | 1020110077001 A | 7/2011 |
| WO | 2016163115 A1 | 10/2016 |

\* cited by examiner

NONAQUEOUS ELECTROLYTE SECONDARY BATTERY AND BATTERY MODULE

This nonprovisional application is based on Japanese Patent Application No. 2021-073928 filed on Apr. 26, 2021, with the Japan Patent Office, the entire contents of which are hereby incorporated by reference.

BACKGROUND OF THE INVENTION

Field of the Invention

The present technology relates to a nonaqueous electrolyte secondary battery and a battery module.

Description of the Background Art

WO 2016/163115 discloses a protective layer disposed on a surface of a negative electrode active material layer.

SUMMARY OF THE INVENTION

In a process of manufacturing a nonaqueous electrolyte secondary battery (in the present specification, simply referred to as "battery"), it is considered that a metal piece (foreign matter) is introduced into the battery. The metal piece can be, for example, cutting swarf of an electrode plate, welding spatters of various members, or the like.

For example, it is considered that a metal piece is attached to a positive electrode plate. The metal piece attached to the positive electrode plate is under a high-potential environment. In the high-potential environment, the metal piece can be relatively readily oxidized and can be dissolved in an electrolyte solution. The metal dissolved in the electrolyte solution can be precipitated on a surface of the negative electrode plate. The metal can be precipitated in the form of a needle. The precipitation of the needle-shaped metal can be reflected, for example, in voltage drop. Conventionally, in order to detect such a needle-shaped metal, a voltage drop test is performed during the manufacturing of the battery, for example.

For example, it is also considered that a metal piece is attached to the negative electrode plate. The metal piece attached to the negative electrode plate is under a low-potential environment. In the low potential environment, a dissolution rate of the metal piece can be very low. When a dissolution amount of the metal piece is small (i.e., when a precipitation amount of the needle-shaped metal is small) at the time of the voltage drop test, it is considered that a voltage drop due to the precipitation of the needle-shaped metal is less likely to be detected. Further, when the metal piece before being dissolved is not in the form of a needle but is in the form of, for example, a shape with a small aspect ratio, it is also considered that a voltage drop due to the metal piece before being dissolved is less likely to be detected. In other words, it is considered difficult to detect the metal piece attached to the negative electrode plate by the voltage drop test during the manufacturing.

As a method of detecting the metal piece, a withstand voltage test (dielectric breakdown test) can be also considered. Conventionally, however, also in the withstand voltage test, the metal piece attached to the negative electrode plate tends to be less likely to be detected.

If the metal piece attached to the negative electrode plate is not detected during the manufacturing of the battery, voltage failure may be caused by the metal piece after start of use of the battery. As a countermeasure against the metal piece attached to the negative electrode plate, for example, it has been proposed to introduce a protective layer (ceramic layer) between the negative electrode plate and a separator. However, the protective layer interposed between the negative electrode plate and the separator may cause a decreased output of the battery.

An object of the present technology is to improve detection sensitivity for a metal piece attached to a negative electrode plate.

Hereinafter, configurations, functions, and effects of the present technology will be described. However, a mechanism of function in the present specification includes presumption. The scope of the present technology is not limited by the mechanism of function.

1. A nonaqueous electrolyte secondary battery includes an electrode assembly and an electrolyte solution. The electrode assembly includes a laminated assembly. The laminated assembly includes a positive electrode plate, a negative electrode plate, and a separator. The separator separates the positive electrode plate and the negative electrode plate from each other. The separator includes a porous resin layer. The porous resin layer includes a polyolefin-based material. The negative electrode plate includes a negative electrode active material layer. The negative electrode active material layer includes negative electrode active material particles. The negative electrode active material layer is in direct contact with the porous resin layer. The negative electrode active material layer has a puncture resistance of more than or equal to 0.60 N/mm.

The puncture resistance is calculated by the following formula ($\alpha$):

$$Z = Y/X \qquad (\alpha).$$

In the formula ($\alpha$), "Z" represents the puncture resistance. "Y" represents maximum stress in a puncture test. "X" represents displacement at a time at which the maximum stress is obtained. In the puncture test, the negative electrode active material layer is punctured with a needle having a tip radius of 10 μm at a rate of 10 μm/s in a direction perpendicular to a surface of the negative electrode active material layer.

In the process of manufacturing the battery, a metal piece attached to a surface of the negative electrode active material layer may intrude into the surface of the negative electrode active material layer. This is presumably because the surface of the negative electrode active material layer is soft. Since the metal piece is buried in the negative electrode active material layer, it is considered that dielectric breakdown due to the metal piece is less likely to be detected in the withstand voltage test.

The puncture resistance in the present technology is considered to represent a difficulty of intrusion of the metal piece. That is, it is considered that as the puncture resistance of the negative electrode active material layer is larger, the metal piece is less likely to intrude into the surface of the negative electrode active material layer. When the puncture resistance is more than or equal to 0.60 N/mm, it is expected to obtain desired detection sensitivity in the withstand voltage test. This is presumably due to the following reason: since the metal piece is less likely to be buried in the negative electrode active material layer, the metal piece is likely to protrude from the surface of the negative electrode plate.

2. The porous resin layer may have a thickness retention ratio of, for example, 91.8% to 93.0%. The thickness retention ratio is calculated by the following formula ($\beta$):

$$Tr = (T_1/T_0) \times 100 \qquad (\beta).$$

In the formula (β), "Tr" represents the thickness retention ratio. "$T_0$" represents a thickness of the porous resin layer. "$T_1$" represents a thickness of the porous resin layer in a state in which the porous resin layer is compressed in a thickness direction by a pressure of 13.9 MPa and the pressure is then removed.

The thickness retention ratio in the present technology can be an indicator of creep resistance, for example. That is, it is considered that as the thickness retention ratio is higher, the porous resin layer is less likely to cause creeping.

For example, in the battery module, the periphery of the battery is restrained, thereby applying compression force to the battery. Therefore, pressure is continuously applied to the separator (porous resin layer) in the battery. Since the pressure is continuously applied to the porous resin layer, the porous resin layer may cause creeping. The pressure of 13.9 MPa in the above formula (β) is considered as a pressure applied to the porous resin layer when the battery is restrained.

As described above, the battery of the present technology has high detection sensitivity for the metal piece attached to the negative electrode plate. Therefore, a metal piece having a large size to some extent is expected to be detected in the withstand voltage test. However, a metal piece having a very small size may be unable to be detected in the withstand voltage test.

Even when the withstand voltage test is passed irrespective of the presence of such a metal piece having a small size, no voltage failure may occur at the start of use of the battery. This is because the metal piece is sufficiently small as compared with the thickness of the separator (porous resin layer). However, pressure may be concentrated at a contact point between the metal piece and the porous resin layer. When the battery is used for a long period of time, the porous resin layer may cause creeping locally at the contact point between the metal piece and the porous resin layer. The porous resin layer becomes locally thin due to the creeping, thus presumably resulting in occurrence of voltage failure. This phenomenon is also referred to as "creep short circuit" in the present specification.

Since the thickness retention ratio is more than or equal to 91.8%, a ratio of occurrence of the creep short circuit can be reduced even if the withstand voltage test is passed irrespective of the presence of the metal piece. Since the thickness retention ratio is less than or equal to 93.0%, it is expected to attain an improved output.

3. The negative electrode active material particles may have a median value of circularities of more than or equal to 0.60, for example.

According to a new finding of the present technology, as the circularities of the negative electrode active material particles are higher, the puncture resistance of the negative electrode active material layer tends to be larger. It is considered that as the circularities of the negative electrode active material particles are higher, the negative electrode active material particles are less likely to be oriented in one direction during the compression of the negative electrode active material layer. It is considered that since the negative electrode active material particles are less likely to be oriented in one direction during the compression of the negative electrode active material layer, the negative electrode active material particles are less likely to be collapsed in the thickness direction of the negative electrode active material layer. It is considered that since the negative electrode active material particles are less likely to be collapsed in the thickness direction, the metal piece (foreign matter) is less likely to intrude into the surface of the negative electrode active material layer. Since the median value of circularities is more than or equal to 0.60, the puncture resistance of more than or equal to 0.60 N/mm tends to be likely to be obtained.

4. The porous resin layer may include a first layer, a second layer, and a third layer. The first layer, the second layer, and the third layer are layered in a thickness direction of the porous resin layer. The second layer is interposed between the first layer and the third layer. Each of the first layer and the third layer includes polypropylene. The second layer includes polyethylene. The porous resin layer satisfies a relation of the following formula (γ):

$$t_2/\{(t_1+t_3)\times 0.5\}\leq 1.5 \qquad (\gamma).$$

In the formula (γ), "$t_1$" represents a thickness of the first layer. "$t_2$" represents a thickness of the second layer. "$t_3$" represents a thickness of the third layer.

The porous resin layer may have, for example, a three-layer structure. In the porous resin layer having the three-layer structure, the thickness retention ratio tends to be high when the relation of the formula (γ) is satisfied.

5. A ratio of a thickness of the negative electrode active material layer to a thickness of the laminated assembly may be, for example, 0.35 to 0.45.

As the ratio of the thickness of the negative electrode active material layer to the thickness of the laminated assembly is larger, pressure tends to be more likely to be distributed around the metal piece (foreign matter) introduced in the laminated assembly. Since the ratio of the thickness of the negative electrode active material layer to the thickness of the laminated assembly is more than or equal to 0.35, the ratio of occurrence of the creep short circuit is expected to be reduced, for example. Since the ratio of the thickness of the negative electrode active material layer to the thickness of the laminated assembly is less than or equal to 0.45, the detection sensitivity for the metal piece in the withstand voltage test is expected to be improved, for example.

6. In the electrode assembly, the number of layers of the positive electrode plate may be, for example, 60 to 80.

As the number of the layers of the positive electrode plate is larger, pressure tends to be more likely to be distributed around the metal piece (foreign matter) introduced in the electrode assembly. Since the number of the layers of the positive electrode plate is more than or equal to 60, the ratio of occurrence of creep short circuit is expected to be reduced, for example. Since the number of the layers of the positive electrode plate is less than or equal to 80, it is expected to improve the detection sensitivity for the metal piece in the withstand voltage test, for example.

7. The porous resin layer may have a thickness of 14 μm to 20 μm, for example.

8. The porous resin layer may have a puncture strength of less than or equal to 3.92 N, for example.

Since the puncture strength of the porous resin layer is less than or equal to 3.92 N, it is expected to improve the detection sensitivity for the metal piece in the withstand voltage test, for example.

9. The negative electrode active material layer may have the puncture resistance of less than or equal to 0.85 N/mm, for example.

10. The negative electrode active material particles may have a median value of circularities of less than or equal to 0.85, for example.

11. A battery module includes a plurality of single-cells. The plurality of single-cells are arranged side by side in an arrangement direction. The arrangement direction is along a layering direction of the positive electrode plate, the negative electrode plate, and the separator in the electrode assembly. Each of the plurality of single-cells receives compression force along the arrangement direction. Each of the plurality of single-cells is the nonaqueous electrolyte secondary battery according to 1 to 10 above.

The foregoing and other objects, features, aspects and advantages of the present technology will become more apparent from the following detailed description of the present technology when taken in conjunction with the accompanying drawings.

DESCRIPTION OF THE PREFERRED EMBODIMENTS

Figure 1:
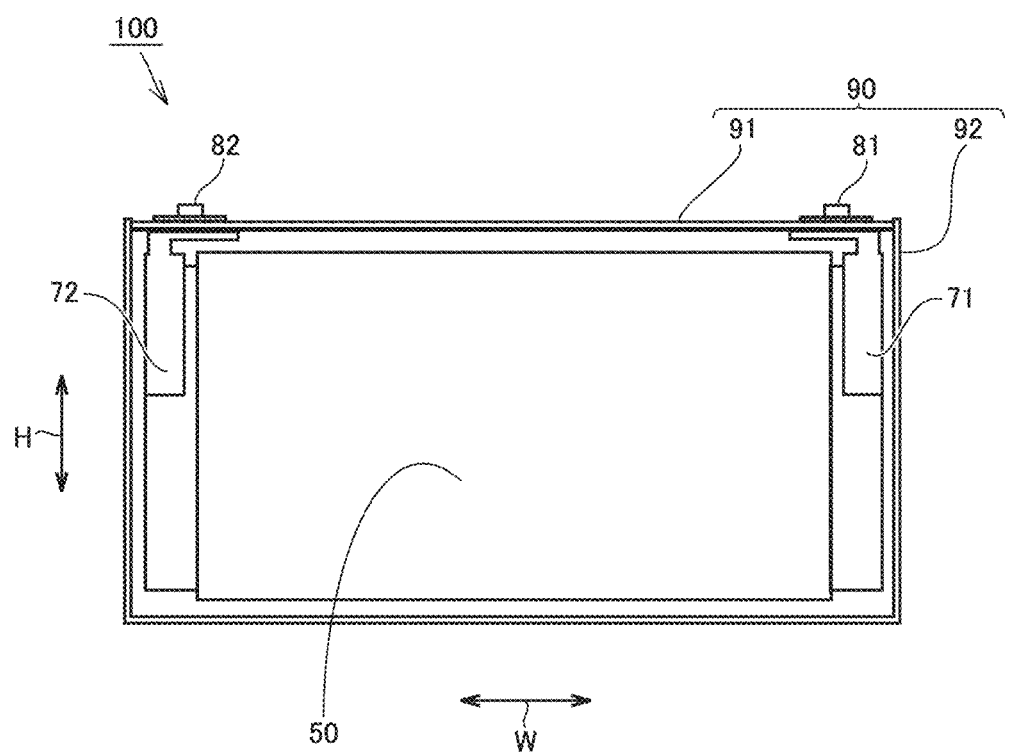
FIG. 1 is a schematic diagram showing an exemplary configuration of a nonaqueous electrolyte secondary battery in the present embodiment.

Hereinafter, an embodiment (also referred to as "the present embodiment" in the present specification) of the present technology will be described. However, the scope of the present technology is not limited by the following description. For example, a description regarding functions and effects in the present specification does not limit the scope of the present technology to the scope in which all the functions and effects are exhibited.

Definitions of Terms, Etc

In the present specification, expressions such as "comprise", "include", and "have" as well as their variants (such as "be composed of", "encompass", "involve", "contain", "carry", "support", and "hold") are open-end expressions. Each of the open-end expressions may or may not further include additional element(s) in addition to essential element(s). The expression "consist of" is a closed expression. The expression "consist essentially of" is a semi-closed expression. The semi-closed expression may further include additional element(s) in addition to essential element(s) as long as the object of the present technology is not compromised. For example, a normally conceivable element (such as an inevitable impurity) in the field to which the present technology belongs may be included as an additional element.

In the present specification, each of the words "may" and "can" is used in a permissible sense, i.e., "have a possibility to do", rather than in a mandatory sense, i.e., "must do".

In the present specification, elements expressed by singular forms ("a", "an", and "the") also include plural forms as well, unless otherwise stated particularly. For example, the term "particle" can mean not only "one particle" but also an "aggregate (powdery body, powder, particle group) of particles".

In the present specification, a numerical range such as "91.8% to 93.0%" and "91.8 to 93.0%" includes the lower and upper limit values unless otherwise stated particularly. That is, each of the expressions "91.8% to 93.0%" and "91.8 to 93.0%" represents a numerical range of "more than or equal to 91.8% and less than or equal to 93.0%". Further, numerical values freely selected from the numerical range may be employed as new lower and upper limit values. For example, a new numerical range may be set by freely combining a numerical value described in the numerical range with a numerical value described in another portion of the present specification, a table, a figure, or the like.

In the present specification, all the numerical values are modified by the term "about". The term "about" can mean, for example, +5%, +3%, +1%, or the like. All the numerical values are approximate values that can be changed depending on a manner of use of the present technology. All the numerical values are indicated as significant figures. Each of all the measurement values or the like can be rounded off based on the number of digits of each significant figure. Each of all the numerical values may include an error resulting from a detection limit of a measurement apparatus or the like, for example.

In the present specification, when a compound is expressed by a stoichiometric composition formula such as "$LiCoO_2$", the stoichiometric composition formula merely indicates a representative example. The composition ratio may be non-stoichiometric. For example, when a lithium cobaltate is expressed as "$LiCoO_2$", the lithium cobaltate is not limited to a composition ratio of "Li/Co/O=1/1/2" unless otherwise stated particularly, and can include Li, Co, and O at any composition ratio. Further, doping or substitution with a small amount of element may be also permitted.

Geometric terms in the present specification (for example, the terms such as "parallel", "perpendicular", and "orthogonal") should not be interpreted in a strict sense. For example, the term "parallel" may be deviated to some extent from the strict definition of the term "parallel". The geometric terms in the present specification can include, for example, a tolerance, an error, and the like in terms of design, operation, manufacturing, and the like. A dimensional relation in each of the figures may not coincide with an actual dimensional relation. In order to facilitate understanding of the present technology, the dimensional relation (length, width, thickness, or the like) in each figure may be changed. Further, part of configurations may be omitted.

<Nonaqueous Electrolyte Secondary Battery>

FIG. 1 is a schematic diagram showing an exemplary configuration of a nonaqueous electrolyte secondary battery in the present embodiment.

A battery 100 can be used for any purpose of use. Battery 100 may be used as a main electric power supply or a motive power assisting electric power supply in an electrically powered vehicle or the like, for example. A plurality of batteries 100 may be coupled to form a battery module or a battery pack. Battery 100 may have a rated capacity of 1 to 200 Ah, for example.

Battery 100 includes an exterior package 90. Exterior package 90 has a prismatic shape (flat rectangular parallelepiped shape). Exterior package 90 may be composed of, for example, an aluminum (Al) alloy. Exterior package 90 stores an electrode assembly 50 and an electrolyte solution (not shown). That is, battery 100 includes electrode assembly 50 and the electrolyte solution.

Exterior package 90 may include, for example, a sealing plate 91 and an exterior container 92. Sealing plate 91 closes an opening of exterior container 92. For example, sealing plate 91 and exterior container 92 may be joined to each other by laser processing or the like. It should be noted that exterior package 90 may have any shape. Exterior package 90 may have a pouch shape or the like, for example. That is, exterior package 90 may be a pouch composed of an Al laminate film or the like.

A positive electrode terminal 81 and a negative electrode terminal 82 are provided on sealing plate 91. Sealing plate 91 may be further provided with an injection opening (not shown), a gas discharge valve (not shown), and the like. The electrolyte solution can be injected from the injection opening to inside of exterior package 90. The injection opening may be closed by, for example, a sealing plug or the like. Positive electrode current collecting member 71 connects positive electrode terminal 81 and electrode assembly 50 to each other. Positive electrode current collecting member 71 may be, for example, an Al plate or the like. Negative electrode current collecting member 72 connects negative electrode terminal 82 and electrode assembly 50 to each other. Negative electrode current collecting member 72 may be, for example, a copper (Cu) plate or the like.

Figure 2:
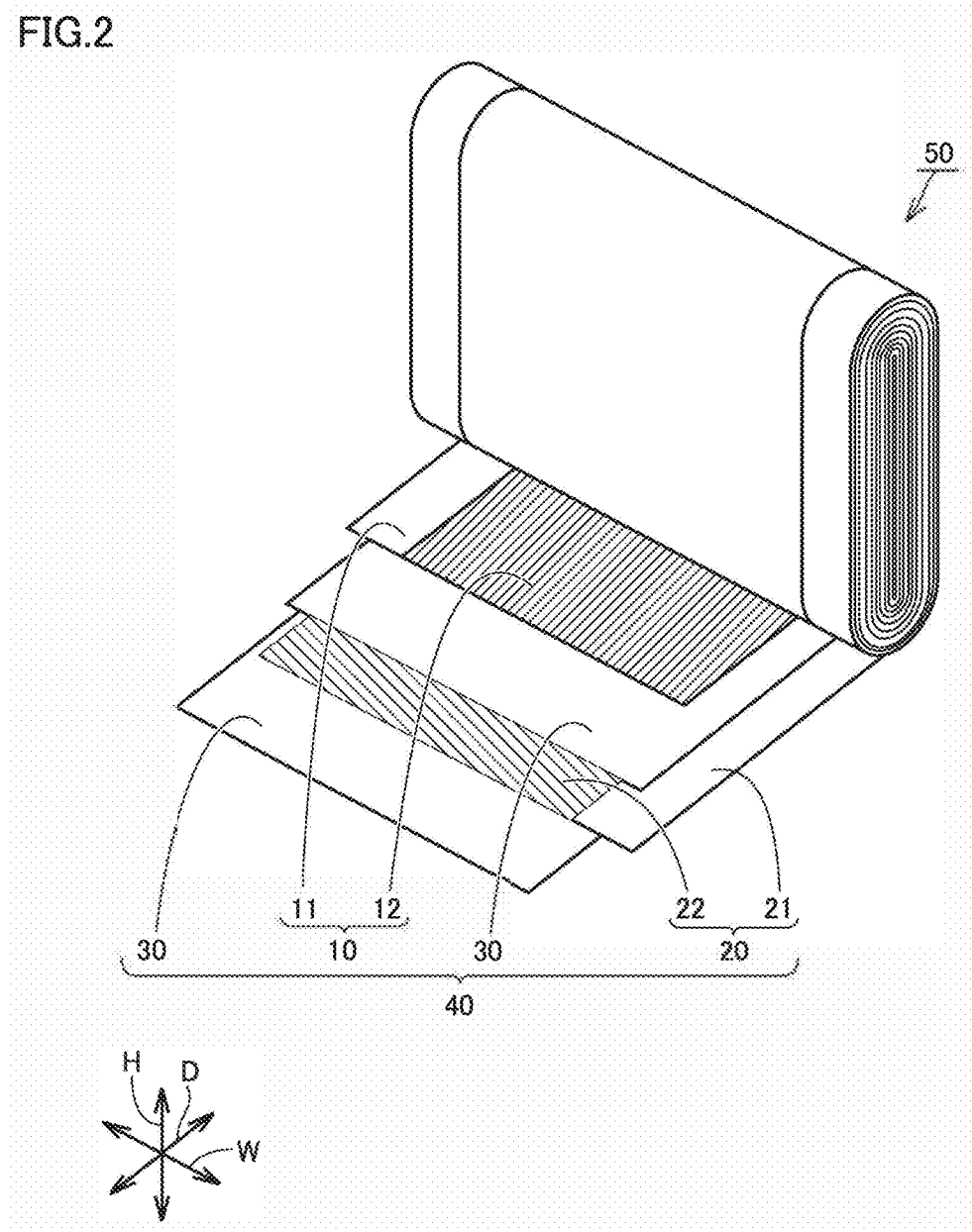
FIG. 2 is a schematic diagram showing an exemplary configuration of an electrode assembly in the present embodiment.

FIG. 2 is a schematic diagram showing an exemplary configuration of an electrode assembly in the present embodiment.

Electrode assembly 50 includes a laminated assembly 40. Electrode assembly 50 may consist essentially of laminated assembly 40. Laminated assembly 40 includes a positive electrode plate 10, a negative electrode plate 20, and a separator 30. At least a portion of separator 30 is interposed between positive electrode plate 10 and negative electrode plate 20. Separator 30 separates positive electrode plate 10 and negative electrode plate 20 from each other. Laminated assembly 40 may include one separator 30 solely. Laminated assembly 40 may include two separators 30. For example, positive electrode plate 10 may be sandwiched between two separators 30. For example, negative electrode plate 20 may be sandwiched between two separators 30. Laminated assembly 40 may be formed by layering separator 30 (first separator), negative electrode plate 20, separator 30 (second separator), and positive electrode plate 10 in this order, for example.

Electrode assembly 50 may be, for example, of a wound type or stacked type. When electrode assembly 50 is of the wound type, each of positive electrode plate 10, negative electrode plate 20, and separator 30 may have, for example, a strip-like planar shape. That is, laminated assembly 40 may have a strip-like planar shape. Strip-like laminated assembly 40 is spirally wound, thereby forming a wound assembly. The wound assembly may have a tubular shape, for example. By compressing the wound assembly having the tubular shape in the radial direction, electrode assembly 50 having a flat shape can be formed.

When electrode assembly 50 is of the stacked type, each of positive electrode plate 10, negative electrode plate 20, and separator 30 may have a quadrangular planar shape. That is, laminated assembly 40 may have a quadrangular planar shape. Electrode assembly 50 can be formed by stacking a plurality of laminated assemblies 40 in one predetermined direction.

Figure 3:
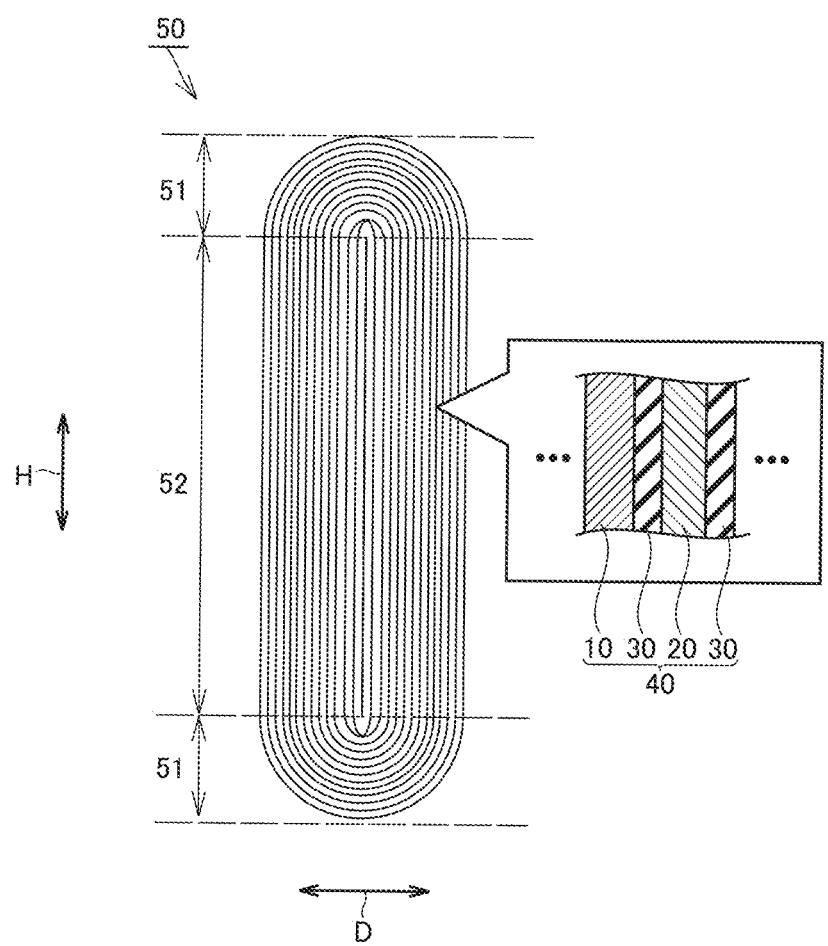
FIG. 3 is a schematic cross sectional view showing an exemplary configuration of the electrode assembly in the present embodiment.

FIG. 3 is a schematic cross sectional view showing an exemplary configuration of the electrode assembly in the present embodiment.

Electrode assembly 50 of FIG. 3 is of the wound type. FIG. 3 shows a cross section orthogonal to a winding axis. Electrode assembly 50 includes curved portions 51 and a flat portion 52. At each of curved portions 51, laminated assembly 40 is curved. At curved portion 51, laminated assembly 40 may be in the form of an arc. At flat portion 52, laminated assembly 40 is flat. Flat portion 52 is sandwiched between two curved portions 51. Flat portion 52 connects two curved portions 51 to each other. It should be noted that electrode assembly 50 of the stacked type consists essentially of flat portion 52.

In electrode assembly 50, positive electrode plate 10 may have any number of layers. The number of the layers of positive electrode plate 10 represent the number of times a straight line extending across electrode assembly 50 in a layering direction intersects positive electrode plate 10. The layering direction represents a direction in which positive electrode plate 10, negative electrode plate 20, and separator 30 are layered in electrode assembly 50. The layering direction in electrode assembly 50 of the wound type is parallel to the thickness direction (D axis direction in FIG. 3) of each of positive electrode plate 10, negative electrode plate 20, and separator 30 in flat portion 52. The layering direction in electrode assembly 50 of the stacked type is parallel to the thickness direction of each of positive electrode plate 10, negative electrode plate 20, and separator 30.

As the number of the layers of positive electrode plate 10 is larger, pressure tends to be more likely to be distributed around a metal piece (foreign matter) introduced in electrode assembly 50. The number of the layers of positive electrode plate 10 may be 60 to 80, for example. Since the number of the layers of positive electrode plate 10 is more than or equal to 60, a ratio of occurrence of creep short circuit is expected to be reduced, for example. Since the number of the layers of positive electrode plate 10 is less than or equal to 80, it is expected to improve detection sensitivity for the metal piece in a withstand voltage test, for example. The number of the layers of positive electrode plate 10 may be 60 to 70, for example. It should be noted that when electrode assembly 50 is of the stacked type, the number of the layers of positive electrode plate 10 represents the number of positive electrode plates 10.

The number of layers of negative electrode plate 20 may be 60 to 80, for example. The number of layers of separator 30 may be 120 to 160, for example. The number of the layers of negative electrode plate 20 and the number of the layers of separator 30 can be also counted in the same manner as the number of the layers of positive electrode plate 10.

<<Negative Electrode Plate>>

Negative electrode plate 20 includes a negative electrode active material layer 22 (see FIG. 2). Negative electrode plate 20 may consist essentially of negative electrode active material layer 22. Negative electrode plate 20 may further include a negative electrode substrate 21, for example. For example, negative electrode active material layer 22 may be disposed on a surface of negative electrode substrate 21. Negative electrode active material layer 22 may be disposed only on one surface of negative electrode substrate 21. Negative electrode active material layer 22 may be disposed on each of both front and rear surfaces of negative electrode substrate 21. Negative electrode substrate 21 is an electrically conductive sheet. Negative electrode substrate 21 may include, for example, a pure Cu foil, a Cu alloy foil, or the like. Negative electrode substrate 21 may have a thickness of, for example, 5 to 30 μm. Negative electrode substrate 21 may be exposed at one end portion in the width direction of negative electrode plate 20 (W axis direction in FIG. 2). Negative electrode current collecting member 72 can be joined to the exposed portion of negative electrode substrate 21 (see FIG. 1).

(Puncture Resistance)

Figure 4:
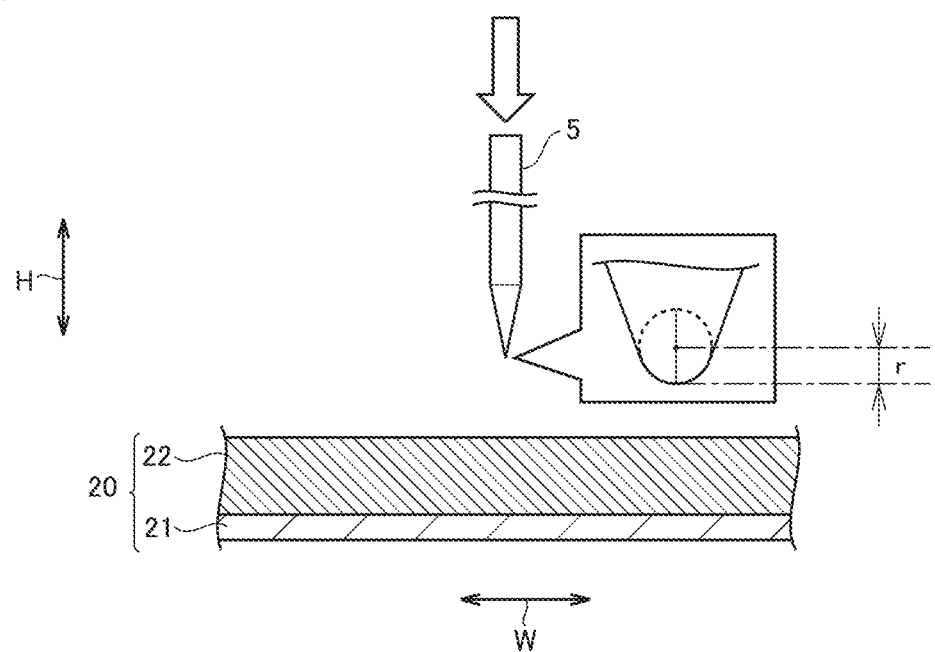
FIG. 4 is a first explanatory diagram for a puncture test.

FIG. 4 is a first explanatory diagram for a puncture test.

Negative electrode active material layer 22 has a puncture resistance of more than or equal to 0.60 N/mm. The puncture resistance can be measured through a puncture test. A needle 5 is prepared. The tip of needle 5 has a spherical shape. Needle 5 has a tip radius (r) of 10 μm. Needle 5 is composed of a metal. Needle 5 may be composed of stainless steel, for example. Needle 5 is attached to a movable portion of a puncture tester. Negative electrode plate 20 is fixed on a stage of the puncture tester. Negative electrode active material layer 22 is punctured with needle 5 in a direction perpendicular to a surface of negative electrode active material layer 22. A test rate (puncture rate) is 10 μm/s. A test temperature is 25° C.±5° C.

Figure 5:
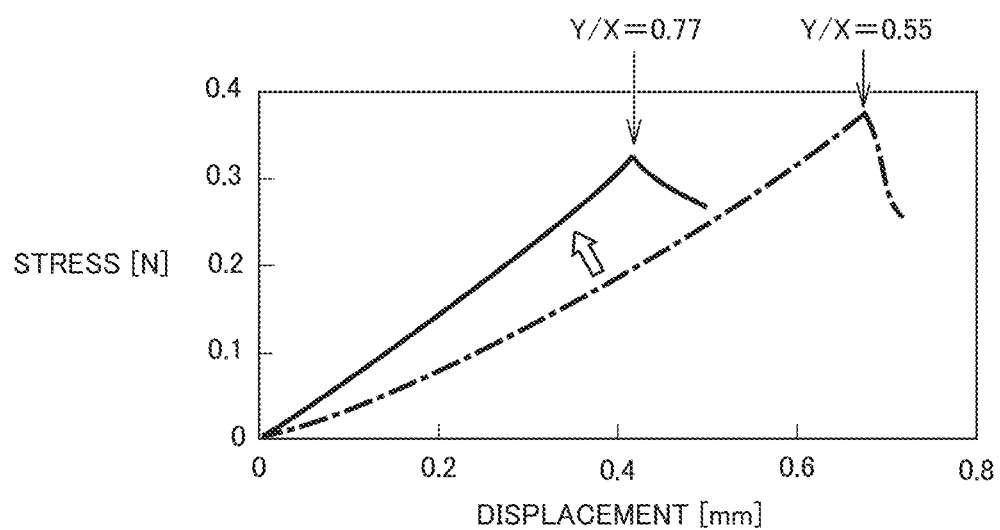
FIG. 5 is a second explanatory diagram for the puncture test.

FIG. 5 is a second explanatory diagram for the puncture test.

The puncture test is performed until needle 5 passes through negative electrode active material layer 22. During the puncturing with needle 5, a displacement (depth) of needle 5 and stress are measured. As the displacement is increased, the stress is also increased. The maximum stress (Y) is indicated at a time at which needle 5 passes through negative electrode active material layer 22. After the passing of needle 5 therethrough, the stress is changed to be decreased. A displacement (X) at a time at which the maximum stress was obtained is recorded. By dividing the maximum stress (Y) by the displacement (X), puncture resistance (Z) is obtained (see the above formula (α)). The puncture resistance (Z) has a dimension of "$MT^{-2}$ (=M×L× $T^{-2}$×$L^{-1}$)" For one measurement target, the puncture resistance is measured three or more times. The arithmetic mean of the three or more results is employed.

As the puncture resistance of the negative electrode active material layer is larger, the detection sensitivity for the metal piece in the withstand voltage test is expected to be improved. The puncture resistance may be more than or equal to 0.67 N/mm, may be more than or equal to 0.74 N/mm, or may be more than or equal to 0.78 N/mm, for example. The puncture resistance may have any upper limit value. The puncture resistance may be less than or equal to 0.85 N/mm, for example.

(Thickness of Negative Electrode Active Material Layer)

A ratio of the thickness of negative electrode active material layer 22 to the thickness of laminated assembly 40 may be, for example, 0.35 to 0.45. As the ratio of the thickness of negative electrode active material layer 22 to the thickness of laminated assembly 40 is larger, pressure tends to be more likely to be distributed around the metal piece (foreign matter) introduced in laminated assembly 40. Since the ratio of the thickness of negative electrode active material layer 22 to the thickness of laminated assembly 40 is more than or equal to 0.35, the ratio of occurrence of creep short circuit is expected to be reduced, for example. Since the ratio of the thickness of negative electrode active material layer 22 to the thickness of laminated assembly 40 is less than or equal to 0.45, the detection sensitivity for the metal piece in the withstand voltage test is expected to be improved.

The thickness of laminated assembly 40 represents the total of the thicknesses of positive electrode plate 10, negative electrode plate 20 and separator 30 included in laminated assembly 40. Laminated assembly 40 may have a thickness of 100 to 200 μm or may have a thickness of 120 to 180 μm, for example.

The thickness of negative electrode active material layer 22 represents the total of the thickness(es) of negative electrode active material layer(s) 22 included in laminated assembly 40. For example, when negative electrode active material layers 22 are formed on the both surfaces of negative electrode plate 20, the thickness of negative electrode active material layer 22 represents the total of the thicknesses of negative electrode active material layers 22 on the both surfaces (two surfaces) thereof. Negative electrode active material layers 22 may have a thickness of 40 to 80 μm or may have a thickness of 50 to 70 μm, for example. It should be noted that the thickness of negative electrode active material layer 22 on one surface thereof may be 20 to 40 μm or may be 25 to 35 μm, for example.

Negative electrode active material layer 22 may have a density of 0.5 to 2.0 g/cm³ or may have a density of 1.0 to 1.5 g/cm³, for example. The density of negative electrode active material layer 22 is calculated by dividing the mass of negative electrode active material layer 22 by the apparent volume of negative electrode active material layer 22. The apparent volume includes the volume of voids in negative electrode active material layer 22.

(Negative Electrode Active Material Particles)

Negative electrode active material layer 22 includes negative electrode active material particles. Negative electrode active material layer 22 may consist essentially of the negative electrode active material particles. The negative electrode active material particles may include at least one selected from a group consisting of natural graphite, artificial graphite, silicon, silicon oxide, tin, tin oxide, and $Li_4Ti_5O_{12}$, for example. The negative electrode active material particles may be composite particles, for example. The negative electrode active material particles may include, for example, substrate particles and coating films. The coating films can coat the surfaces of the substrate particles. The substrate particles may include natural graphite or the like, for example. The coating films may include, for example, amorphous carbon or the like.

Each of the negative electrode active material particles can have any shape. The negative electrode active material particle may have a spherical shape, a lump-like shape, a flake-like shape, or the like, for example. Each of the negative electrode active material particles may be, for example, spherical graphite or the like. When each of the negative electrode active material particles has a shape approximate to the spherical shape in negative electrode active material layer 22 having been compressed, the puncture resistance of negative electrode active material layer 22 tends to be large. The shape of each of the negative electrode active material particles in negative electrode active material layer 22 having been compressed can be evaluated in accordance with a circularity, for example.

(Circularity)

Figure 6:
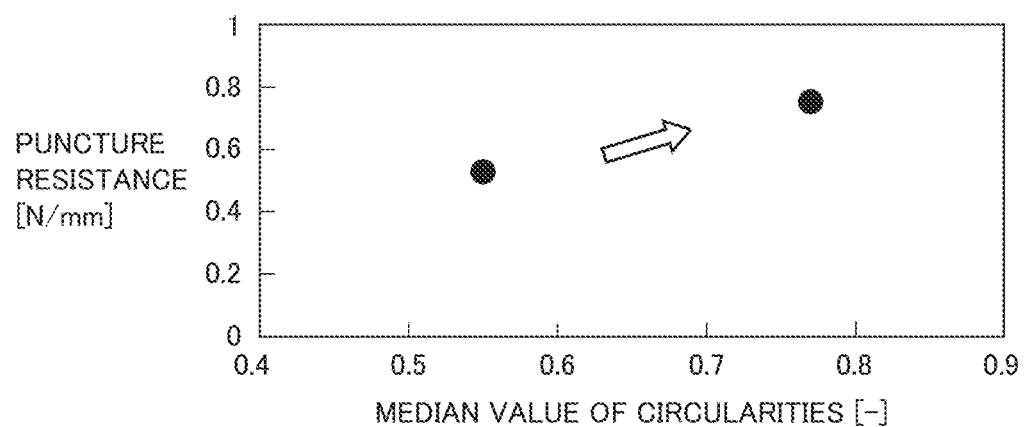
FIG. 6 is a graph showing a relation between a median value of circularities of negative electrode active material particles and puncture resistance of a negative electrode active material layer.

FIG. 6 is a graph showing a relation between a median value of circularities of the negative electrode active material particles and the puncture resistance of the negative electrode active material layer. As the median value of circularities is higher, the puncture resistance of negative electrode active material layer 22 tends to be larger. The median value of circularities may be more than or equal to 0.60, may be more than or equal to 0.69, or may be more than or equal to 0.78, for example.

The median value of circularities may be less than or equal to 0.85, for example. Each of the circularities can be changed by a compression ratio of negative electrode active material layer 22 or the like, for example. Since the median value of circularities is less than or equal to 0.85, a high-density negative electrode active material layer 22 tends to be more likely to be formed.

The circularity can be measured in accordance with the following procedure.

A test piece having a predetermined size is cut out from negative electrode plate 20 having been compressed. The test piece is buried in a resin material. By cutting the buried test piece, a cross sectional sample of negative electrode active material layer 22 is produced. The cross sectional sample includes a cross section perpendicular to the surface of negative electrode active material layer 22. The cross sectional sample is subjected to a cleaning process (ion milling process). After the cleaning, a cross sectional SEM image is obtained by observing the cross sectional sample using a SEM (scanning electron microscope). In the cross sectional SEM image, 30 negative electrode active material particles are randomly extracted. The respective circularities of the 30 negative electrode active material particles are measured. The median value is calculated from the 30 circularities.

The circularity of each of the individual particles is calculated by the following formula (δ):

$$R = 4\pi S/L^2 \quad (6).$$

In the formula (δ), "R" represents the circularity. "S" represents the area of the cross sectional image of the particle. "L" represents the peripheral length (length of the contour line) of the cross sectional image of the particle. The circularity of a true circle is 1. That is, the median value of the circularities may be less than or equal to 1.

(Particle Size)

The negative electrode active material particles may have a D50 of 5 to 20 μm, may have a D50 of 9.5 to 15 μm, or may have a D50 of 10 to 12 μm, for example. In the present specification, "D50" is defined as a particle diameter corresponding to a cumulative frequency of 50% from the smallest particle diameter in a volume-based particle size distribution. The volume-based particle size distribution can be measured by a laser diffraction type particle size distribution measurement apparatus. Examples thereof usable herein may include: a laser diffraction type particle size distribution measurement apparatus with the product name "SALD-2200" as provided by Shimadzu Corporation; or a product equivalent to the foregoing apparatus.

The negative electrode active material particles may have an arithmetic mean diameter of 5 to 20 μm, may have an arithmetic mean diameter of 9.5 to 15 μm, or may have an arithmetic mean diameter of 10 to 12 μm, for example. The "arithmetic mean diameter" in the present specification can be measured in negative electrode active material layer 22 having been compressed. In the cross sectional SEM image, the respective diameters of the 30 negative electrode active material particles are measured. The diameter of each negative electrode active material particle represents a distance between two points the most distant from each other on the contour line of the negative electrode active material particle. The arithmetic mean of the 30 diameters is regarded as the arithmetic mean diameter. Depending on a method of producing negative electrode plate 20, the D50 and the arithmetic mean diameter may be different from each other or the D50 and the arithmetic mean diameter may be substantially the same.

(Optional Components)

Negative electrode active material layer 22 may further include a conductive material, a binder, and the like in addition to the negative electrode active material particles. For example, negative electrode active material layer 22 may consist essentially of 0 to 10% of the conductive material in mass fraction, 0.1 to 10% of the binder in mass fraction, and a remainder of the negative electrode active material particles. The conductive material can include any component. The conductive material may include, for example, carbon black, carbon nanotube, or the like. The binder can include any component. The binder may include, for example, at least one selected from a group consisting of carboxymethyl cellulose (CMC) and styrene-butadiene rubber (SBR).

<<Separator>>

Separator 30 includes a porous resin layer. Separator 30 may consist essentially of a porous resin layer. The porous resin layer is in direct contact with negative electrode active material layer 22. Since no object is interposed between the porous resin layer and negative electrode active material layer 22, it is expected to attain an improved output or the like, for example. It should be noted that separator 30 may or may not include a protective layer on its surface to be in contact with positive electrode active material layer 12.

The porous resin layer may have an air permeability of 100 to 400 s/100 mL, for example. In the present specification, the "air permeability" represents "air resistance" defined in "JIS P 8117: 2009". The air permeability is measured by the Gurley test method.

The porous resin layer may have a thickness of 10 to 50 μm, may have a thickness of 10 to 30 μm, or may have a thickness of 14 to 20 μm, for example.

The porous resin layer has an electric insulation property. The porous resin layer includes a polyolefin-based material. The porous resin layer may consist essentially of a polyolefin-based material, for example. The polyolefin-based material may include at least one selected from a group consisting of polyethylene (PE) and polypropylene (PP), for example.

(Thickness Retention Ratio)

The porous resin layer may have a thickness retention ratio of, for example, 91.8 to 93.0%. Since the thickness retention ratio is more than or equal to 91.8%, even when the withstand voltage test is passed irrespective of the presence of the metal piece, the ratio of occurrence of the creep short circuit can be reduced. Since the thickness retention ratio is less than or equal to 93.0%, it is expected to attain an improved output or the like, for example. The porous resin layer may have a thickness retention ratio of 91.8 to 92.1% or may have a thickness retention ratio of 92.1 to 93.0%, for example.

The thickness retention ratio can be measured in accordance with the following procedure.

Test pieces of the porous resin layer are cut out from separator 30. Each of the test pieces can have a planar size of, for example, 2 cm×2 cm 140 test pieces are prepared. The test pieces are sampled from a portion with permanent set as little as possible. For example, in the case of electrode assembly 50 of the wound type, the test pieces can be sampled from curved portions 51 (see FIG. 3). In flat portion 52, the permanent set may be generated in the thickness direction of separator 30.

A planar indenter is prepared. The planar indenter has a square planar shape. The planar indenter is attached to a movable portion of a compression tester. The planar indenter can have a planar size of, for example, 2 cm×2 cm. A pre-compression thickness ($T_0$) of the test piece is measured. The pre-compression thickness ($T_0$) can be measured by a micrometer. For example, a micrometer (constant pressure type) provided by Mitsutoyo or the like may be used.

The 140 test pieces are layered to form a specimen. The specimen is placed on a stage of the compression tester. A test temperature is 25° C.±5° C. Pressure is applied to the specimen by the planar indenter. A pressure application direction is along the layering direction of the test pieces included in the specimen. A test rate (pressure increasing rate) is 6.95 MPa/s. The pressure reaches a target value (13.9 MPa) in 2 seconds. At the time at which the pressure reaches the target value, the pressure is released. After the release of pressure, the test pieces are left for 30 minutes. After being left, one sample piece is sampled from the specimen. The thickness ($T_1$) of the portion of the test piece having been in contact with the planar indenter is measured. That is, the thickness ($T_1$) of the porous resin layer is measured in a state in which the porous resin layer is compressed in the thickness direction by the pressure of 13.9 MPa and the pressure is then removed. The post-compression thickness ($T_1$) may also be measured by the micrometer. The thickness retention ratio (Tr) is calculated by dividing the post-compression thickness ($T_1$) by the pre-compression thickness ($T_0$) (see the above formula (β)). The thickness retention ratio (Tr) is expressed in percentage.

(Multilayer Structure)

The porous resin layer may have a single-layer structure, for example. The porous resin layer may consist essentially of a PE layer, for example.

Figure 7:
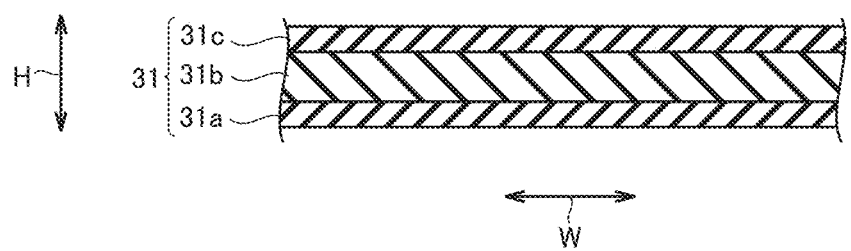
FIG. 7 is a schematic cross sectional view showing an exemplary multilayer structure.

FIG. 7 is a schematic cross sectional view showing an exemplary multilayer structure.

Porous resin layer 31 may have, for example, a multilayer structure. Porous resin layer 31 may have, for example, a three-layer structure. Porous resin layer 31 may include, for example, a first layer 31a, a second layer 31b, and a third layer 31c. First layer 31a, second layer 31b, and third layer 31c are layered in the thickness direction of porous resin layer 31 (H axis direction in FIG. 7). Second layer 31b is interposed between first layer 31a and third layer 31c.

Each of first layer 31a and third layer 31c may include, for example, PP. Each of first layer 31a and third layer 31c may consist essentially of PP. That is, each of first layer 31a and third layer 31c may be a PP layer. Second layer 31b may include PE, for example. Second layer 31b may consist essentially of PE. That is, second layer 31b may be a PE layer.

(Thickness Ratio of Second Layer)

The thickness ratio of second layer 31b represents the ratio of the thickness ($t_2$) of second layer 31b to the average thickness (($t_1+t_3$)×0.5) of first layer 31a and third layer 31c. The thickness ratio of second layer 31b may be, for example, less than or equal to 1.5 (see the above formula (γ)).

Figure 8:
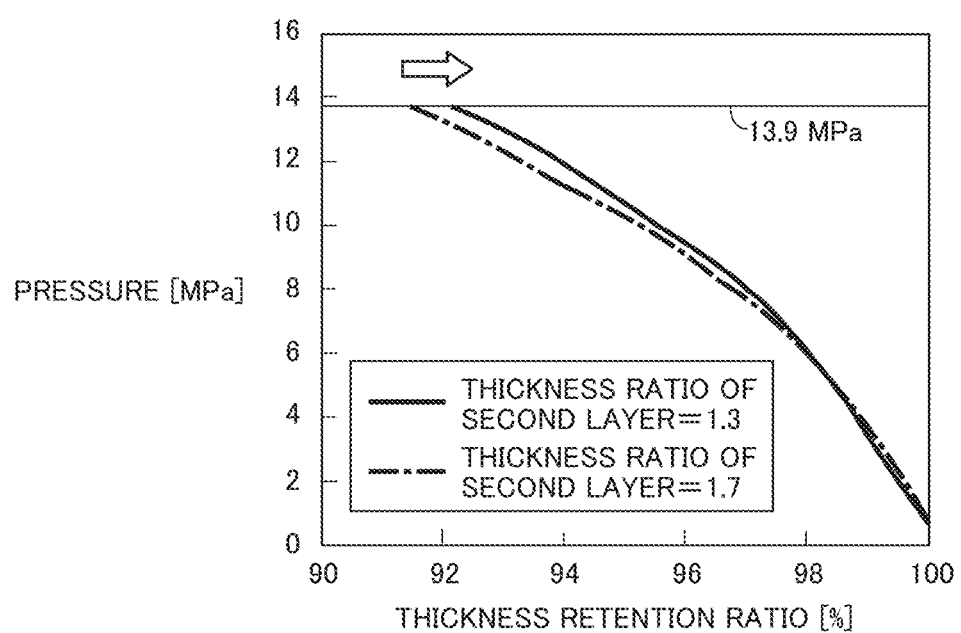
FIG. 8 is a graph showing a relation between a thickness retention ratio and a thickness ratio of a second layer.

FIG. 8 is a graph showing a relation between the thickness retention ratio and the thickness ratio of the second layer.

Since the thickness ratio of second layer 31b is less than or equal to 1.5, it is observed that the thickness retention ratio tends to be high. The thickness ratio of second layer 31b may be less than or equal to 1.31, or may be less than or equal to 1.30, for example. The thickness ratio of second layer 31b may be more than or equal to 1.0, may be more than or equal to 1.1, or may be more than or equal to 1.2, for example.

Each of first layer 31a and third layer 31c may have a thickness of 1 to 10 μm or may have a thickness of 3 to 6 μm, for example. Second layer 31b may have a thickness of 1 to 15 μm or may have a thickness of 5 to 10 μm, for example. It should be noted that the thickness of each layer can be measured by a micrometer after each of first layer 31a and third layer 31c is detached from second layer 31b.

(Puncture Strength)

The porous resin layer may have a puncture strength of less than or equal to 3.92 N, for example. Since the puncture strength of the porous resin layer is less than or equal to 3.92 N, it is expected to improve the detection sensitivity for the metal piece in the withstand voltage test, for example. The porous resin layer may have a puncture strength of 0.98 to 3.92 N, may have a puncture strength of 1.96 to 3.92 N, or may have a puncture strength of 2.94 to 3.92 N, for example.

The puncture strength can be measured in accordance with the following procedure.

A needle is prepared. The needle has a body diameter of 1 mm. The tip of the needle has a spherical shape. The needle has a tip radius of 0.5 mm. The needle is composed of a metal. The needle may be composed of stainless steel, for example. The needle is attached to a movable portion of a puncture tester. A test piece is cut out from the porous resin layer. The test piece can have a planar size of, for example, 2 cm×2 cm. The porous resin layer is fixed on a stage of the puncture tester. The porous resin layer is punctured with the needle in a direction perpendicular to the surface of the porous resin layer. A test rate (puncture rate) is 2 mm/s. A test temperature is 25° C.±5° C. The maximum force until the needle passes through the porous resin layer is the puncture strength. For one measurement target, the puncture strength is measured three or more times. The arithmetic mean of the three or more results is employed.

<<Positive Electrode Plate>>

Positive electrode plate 10 may include a negative electrode substrate 11 and a positive electrode active material layer 12, for example (see FIG. 2). Positive electrode substrate 11 is an electrically conductive sheet. Positive electrode substrate 11 may include, for example, a pure Al foil, an Al alloy foil, or the like. Positive electrode substrate 11 may have a thickness of, for example, 10 to 30 μm. Positive electrode substrate 11 may be exposed at one end portion in the width direction of positive electrode plate 10 (W axis direction in FIG. 2). Positive electrode current collecting member 71 can be joined to the exposed portion of positive electrode substrate 11 (see FIG. 1).

Positive electrode active material layer 12 may be disposed only on one surface of positive electrode substrate 11. Positive electrode active material layer 12 may be disposed on each of the front and rear surfaces of positive electrode substrate 11. As with the thickness of negative electrode active material layer 22 described above, the thickness of positive electrode active material layer 12 represents the total of the thickness(es) of positive electrode active material layer(s) 12 included in laminated assembly 40. For example, when positive electrode active material layers 12 are formed on the both surfaces of positive electrode plate 10, the thickness of positive electrode active material layer 12 represents the total of the thicknesses of positive electrode active material layers 12 on the both surfaces (two surfaces) thereof. Positive electrode active material layers 12 may have a thickness of 20 to 60 μm or may have a thickness of 30 to 50 μm, for example. It should be noted that the thickness of positive electrode active material layer 12 on one surface thereof may be 10 to 30 μm or may be 15 to 25 μm, for example.

Positive electrode active material layer 12 includes positive electrode active material particles. Each of the positive electrode active material particles can include any component. For example, each of the positive electrode active material particles may include at least one selected from a group consisting of $LiCoO_2$, $LiNiO_2$, $LiMnO_2$, $LiMn_2O_4$, $Li(NiCoMn)O_2$, $Li(NiCoAl)O_2$, and $LiFePO_4$. For example, in a composition formula such as "$Li(NiCoMn)O_2$", the total of the composition ratios in the parentheses is 1. That is, a relation of "$C_{Ni}+C_{Co}+C_{Mn}=1$" is satisfied. For example, "$C_{Ni}$" represents a composition ratio of Ni. The composition ratio of each component is arbitrary as long as the total of the composition ratios is 1.

Positive electrode active material layer 12 may further include, for example, a conductive material, a binder, and the like in addition to the positive electrode active material particles. For example, positive electrode active material layer 12 may consist essentially of 0.1 to 10% of the conductive material in mass fraction, 0.1 to 10% of the binder in mass fraction, and a remainder of the positive electrode active material particles. The conductive material may include acetylene black or the like, for example. The binder can include any component. For example, the binder may include polyvinylidene difluoride (PVdF) or the like.

<<Electrolyte Solution>>

The electrolyte solution is a liquid electrolyte. The electrolyte solution includes a solvent and a supporting electrolyte. The solvent is aprotic. The solvent can include any component. The solvent may include, for example, at least one selected from a group consisting of ethylene carbonate (EC), propylene carbonate (PC), butylene carbonate (BC), dimethyl carbonate (DMC), ethyl methyl carbonate (EMC), diethyl carbonate (DEC), 1,2-dimethoxyethane (DME), methyl formate (MF), methyl acetate (MA), methyl propionate (MP), and γ-butyrolactone (GBL).

The supporting electrolyte is dissolved in the solvent. For example, the supporting electrolyte may include at least one selected from a group consisting of $LiPF_6$, $LiBF_4$, and $LiN(FSO_2)_2$. The supporting electrolyte may have a molar concentration of 0.5 to 2.0 mol/L, or may have a molar concentration of 0.8 to 1.2 mol/L, for example.

The electrolyte solution may further include any additive in addition to the solvent and the supporting electrolyte. For example, the electrolyte solution may include the additive having a mass fraction of 0.01 to 5%. The additive may include, for example, at least one selected from a group consisting of vinylene carbonate (VC), lithium difluorophosphate ($LiPO_2F_2$), lithium fluorosulfonate ($FSO_3Li$), and lithium bis[oxalatoborate] (LiBOB).

<Battery Module>

Figure 9:
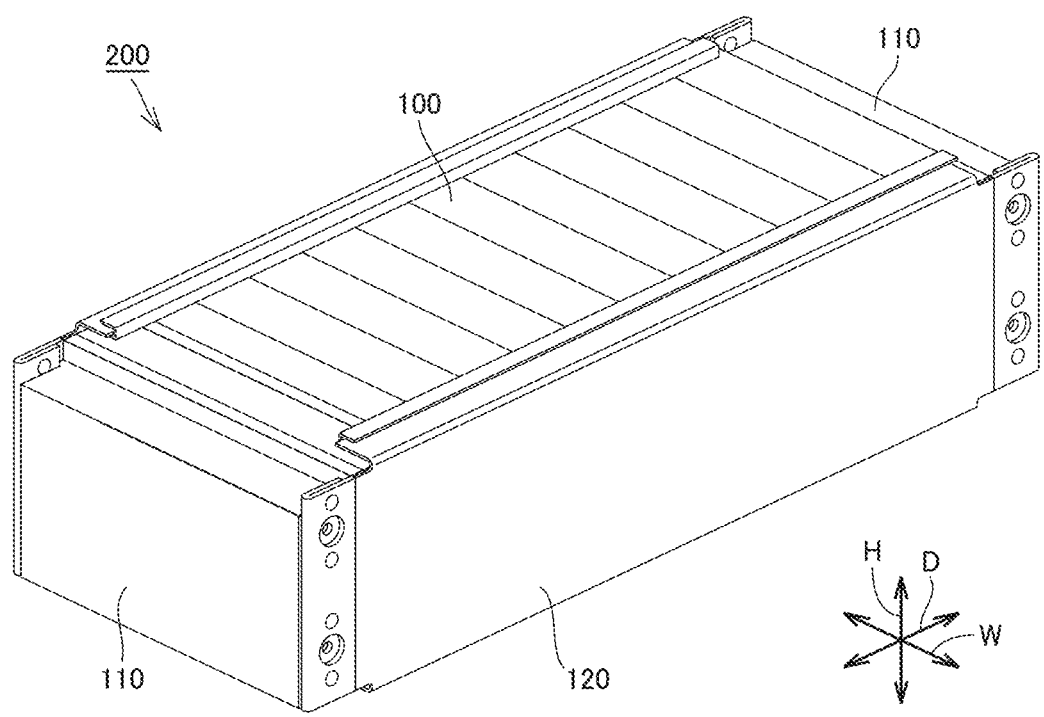
FIG. 9 is a schematic diagram showing an exemplary battery module in the present embodiment.

FIG. 9 is a schematic diagram showing an exemplary battery module in the present embodiment.

In the present technology, a battery module 200 may also be provided. Battery module 200 includes a plurality of single-cells, end plates 110, and a restraint member 120. Each of the plurality of single-cells is battery 100 according to the present embodiment. Battery module 200 may include 2 to 50 single-cells or may include 4 to 20 single-cells, for example.

The plurality of single-cells are arranged side by side in an arrangement direction (D axis direction). The arrangement direction is along the layering direction of positive electrode plate 10, negative electrode plate 20, and separator 30 in electrode assembly 50. The arrangement direction may be parallel to the layering direction. The single-cells can be electrically connected to each other by, for example, a bus bar (not shown). The plurality of single-cells may form, for example, a series circuit or a parallel circuit.

An intermediate plate (not shown) may be interposed between the single-cells. End plates 110 are disposed at both ends in the arrangement direction. Restraint member 120 connects two end plates 110. Restraint member 120 applies tensile force to the two end plates in directions of bringing the two end plates close to each other. Therefore, each of the single-cells receives compression force along the arrangement direction. The separator in the single-cell may receive a pressure of, for example, 13 to 14 MPa. In battery module 200, the ratio of occurrence of creep short circuit is expected to be low, for example.

Examples

Hereinafter, an example of the present technology (also referred to as "the present example" in the present specification) will be described. However, the scope of the present technology is not limited by the following description.

<Manufacturing of Battery>

Each of test batteries (nonaqueous electrolyte secondary batteries) according to No. 1 to No. 9 was manufactured as follows.

<<No. 1>>

(Production of Positive Electrode Plate)

The following materials were prepared.

Positive electrode active material particles: Li (NiCoMn) $O_2$

Conductive material: acetylene black

Binder: PVdF

Dispersion medium: N-methyl-2-pyrrolidone

Positive electrode substrate: Al alloy foil

By mixing the positive electrode active material particles, the conductive material, the binder, and the disperse medium, a positive electrode slurry was prepared. The positive electrode slurry was applied onto both the front and rear surfaces of the positive electrode substrate and was dried, thereby forming a positive electrode active material layer. Thus, a positive electrode raw sheet was produced. The positive electrode raw sheet was compressed. After the compression, the positive electrode raw sheet was cut in the form of a strip, thereby producing a positive electrode plate.

The width (size in the W axis direction of FIG. 2) of the positive electrode plate was 105 mm. The width of the positive electrode active material layer was 90 mm. The positive electrode substrate was exposed for 15 mm at one end of the positive electrode plate in the width direction.

(Production of Negative Electrode Plate)

The following materials were prepared.

Negative electrode active material particles: spheroidized natural graphite

Binder: CMC, SBR

Dispersion medium: water

Negative electrode substrate: Cu alloy foil

D50 of the negative electrode active material particle was measured. D50 is shown in Table 1 below.

By mixing the negative electrode active material particles, the binder, and the dispersion medium, a negative electrode slurry was prepared. The negative electrode slurry was applied onto both the front and rear surfaces of the negative electrode substrate and was dried, thereby forming a negative electrode active material layer. Thus, a negative electrode raw sheet was produced. The negative electrode raw sheet was compressed. After the compression, the negative electrode raw sheet was cut in the form of a strip, thereby producing a negative electrode plate.

The width (size in the W axis direction of FIG. 2) of the negative electrode plate was 107 mm. The width of the negative electrode active material layer was 95 mm. The negative electrode substrate was exposed for 12 mm at one end of the negative electrode plate in the width direction.

In the negative electrode plate, the median value of circularities of the negative electrode active material particles was measured in accordance with the procedure described above. The median value of circularities is shown in Table 1 below.

(Preparation of Separator)

A separator was prepared. The separator consisted of a porous resin layer. The porous resin layer included a first layer (PP layer), a second layer (PE layer), and a third layer (PP layer). The second layer was interposed between the first layer and the third layer.

(Formation of Electrode Assembly)

The separator, the positive electrode plate, the separator, and the negative electrode plate were layered in this order to form a laminated assembly. The laminated assembly was wound around a winding core to form a wound assembly having a tubular shape. The wound assembly was pressed and collapsed in a direction orthogonal to the winding axis, thereby forming the wound assembly into a flat shape. Thus, an electrode assembly was formed.

The thickness (size in the D axis direction in FIG. 3) of the electrode assembly was 10.56 mm. The number of layers of the positive electrode plate was 66. The number of layers of the negative electrode plate was 68. The number of layers of the separator was 140.

The electrode assembly consisted of a flat portion and curved portions. In the outermost layer of the electrode assembly, a portion of the laminated assembly was cut out from the curved portion. At the cutout portion of the laminated assembly, the thicknesses of the positive electrode plate, the negative electrode plate, and the separator were measured. The thickness of each of the members was measured by a constant pressure type micrometer (provided by Mitsutoyo).

The thickness of the negative electrode active material layer was calculated by subtracting the thickness of the negative electrode substrate from the thickness of the negative electrode plate. The thickness of the negative electrode active material layer is shown in Table 1 below. The ratio of the thickness of the negative electrode active material layer to the thickness of the laminated assembly was 0.43.

In the negative electrode plate, the puncture resistance was measured in accordance with the procedure described above. The puncture resistance is shown in Table 1 below.

In the separator, the thickness retention ratio and the puncture strength of the porous resin layer were measured in accordance with the procedures described above. The thickness retention ratio and the puncture strength are shown in Table 1 below. The porous resin layer was separated into three layers. The thickness of each of the layers was measured by a micrometer. The thickness ratio of the second layer (PE layer) was calculated. The thickness ratio of the second layer is shown in Table 1 below.

<<No. 2 to No. 9>>

Each of electrode assemblies including negative electrode plates and separators shown in Table 1 below was formed.

<Evaluations>

<<Detection Sensitivity in Withstand Voltage Test>>

In the outermost layer of each electrode assembly, a simulated foreign matter was placed on a surface of the negative electrode plate. The simulated foreign matter was a metal sphere (having a diameter of 200 μm and composed of SUS304). After the placement of the simulated foreign matter, a withstand voltage test with 200 V was performed. When a leakage current of more than or equal to 50 mA flowed, it was determined that the detection sensitivity was excellent. An electrode assembly in which the leakage current of more than or equal to 50 mA flowed was disassembled. In the electrode assembly in which the leakage current of more than or equal to 50 mA flowed, a mark of short circuit was observed at a position corresponding to the simulated foreign matter. When an evaluation result is "P" in Table 1 below, it is considered that the detection sensitivity for the metal piece is improved.

<<Discharge Resistance>>

An exterior package composed of an Al alloy was prepared. The exterior package had a prismatic shape. The exterior package had an outer size of "120 mm×65 mm×12.55 mm (width W×height H×depth D)". The electrode assembly was accommodated in the exterior package. An electrolyte solution was injected into the exterior package. After the injection of the electrolyte solution, the electrode assembly was sufficiently immersed in the electrolyte solution. After the immersion, a predetermined amount of charging was performed. Gas generated from the electrode assembly during the charging was ejected from the exterior package. After the ejection of the gas, the exterior package was sealed. In this way, a battery was manufactured. It should be noted that the electrolyte solution consisted of the following components.

Solvent: "EC/EMC/DMC=3/3/4 (volume ratio)"
Supporting electrolyte: $LiPF_6$ (1 mol/L)
Additive: VC (0.3% in mass fraction)

The voltage of the battery was adjusted to 3.51 V by constant current-constant voltage (CC-CV) charging. A current during constant current (CC) charging was 1 It. A total charging time was 1.5 hours. It should be noted that "1 It" is defined as a current by which the rated capacity of the battery is fully discharged in one hour.

The battery was discharged by a current of 75 It for 10 seconds. The discharge resistance was calculated from the inclination of the current-voltage graph during the discharging. The discharge resistance is shown in Table 1 below. The discharge resistance in Table 1 below is a relative value when the discharge resistance of No. 1 is defined as 100. It is considered that as the discharge resistance is lower, the output is more excellent.

<<Creep Short Circuit Resistance>>

The electrode assembly was prepared. In the flat portion of the outermost layer of the electrode assembly, a simulated foreign matter was placed on a surface of the negative electrode plate. After the placement of the simulated foreign matter, a battery was manufactured without performing the withstand voltage test.

The voltage of the battery was adjusted to 2.5 V by CC-CV discharging. The current during the CC discharging was 9 It. A cutoff current was 0.25 It. After the end of the discharging, the voltage of the battery was adjusted to 3.176 V by the CC-CV charging. The current during the CC charging was 5 It. The cutoff current was 0.0625 It.

After the charging, two plates and a restraint member were attached to the battery. The battery was sandwiched between the two plates. The restraint member connected the two plates to each other. By pressing the battery by the two plates, the depth (size in the D axis direction in FIG. 9) of the exterior package was reduced to 12.30 mm. That is, the depth was reduced by 0.25 mm. The battery was left for 4 days after the attachment of the restraint member. After being left, it was checked whether or not a voltage was significantly dropped. Further, a battery in which no voltage drop occurred was disassembled, and it was checked whether or not a mark of short circuit was present at a position corresponding to the simulated foreign matter.

TABLE 1

| | No. | 1 | 2 | 3 | 4 | 5 | 6 | 7 | 8 | 9 |
|---|---|---|---|---|---|---|---|---|---|---|
| Electrode Assembly | Thickness [mm] | 10.56 | 10.56 | 10.56 | 10.56 | 10.56 | 10.56 | 10.56 | 10.56 | 10.56 |
| Negative Electrode Plate | Negative Electrode Active Material Layer, Puncture Resistance [N/mm]. | 0.77 | 0.85 | 0.67 | 0.60 | 0.75 | 0.78 | 0.78 | 0.74 | 0.55 |
| | Negative Electrode Active Material Layer, Thickness [μm] | 67 | 67 | 68 | 67 | 67 | 67 | 68 | 68 | 67 |
| | Negative Electrode Active Material Particles, D50 [μm] | 11 | 10 | 11 | 12 | 11 | 11 | 11 | 11 | 11 |
| | Negative Electrode Active Material Particles, Circularities, Median Value [—] | 0.76 | 0.85 | 0.69 | 0.60 | 0.76 | 0.77 | 0.78 | 0.76 | 0.57 |
| Separator[1] | Porous Resin Layer, Thickness ($T_0$) [μm] | 18.0 | 17.9 | 18.0 | 18.2 | 18.0 | 17.9 | 18.1 | 18.0 | 18.1 |
| | Thickness Retention Ratio (Tr) [%] | 92.1 | 92.3 | 91.9 | 92.0 | 91.8 | 93.0 | 91.5 | 94.0 | 92.1 |
| | First Layer + Third Layer, Thickness ($t_1 + t_3$) [μm] | 10.07 | 10.00 | 10.00 | 10.00 | 10.00 | 10.10 | 9.97 | 10.20 | 10.00 |
| | Second Layer, Thickness ($t_2$) [μm] | 6.53 | 6.53 | 6.53 | 6.53 | 6.51 | 6.59 | 6.49 | 6.66 | 6.53 |
| | Thickness Ratio of Second Layer [$t_2/(t_1 + t_3)*0.5$] [—] | 1.30 | 1.31 | 1.31 | 1.31 | 1.30 | 1.30 | 1.30 | 1.31 | 1.31 |
| | Puncture Strength [N] | 3.92 | 3.92 | 3.92 | 3.92 | 3.92 | 3.92 | 3.92 | 3.92 | 3.92 |
| Positive Electrode Plate | Number of Layers [—] | 66 | 66 | 66 | 66 | 66 | 66 | 66 | 66 | 66 |
| Evaluations | Withstand Voltage Test, Detection Sensitivity[2] | P | P | P | P | P | P | P | P | F |
| | Creep Short Circuit Resistance[3] | P | P | P | P | P | P | F | P | P |
| | Discharge Resistance[4] [—] | 100 | 99 | 103 | 104 | 99 | 106 | 95 | 114 | 101 |

Notes
[1]The porous resin layer has a three-layer structure. First Layer (PP layer)/Second Layer (PE layer)/Third Layer (PP layer)
[2]"P" indicates that leakage current was more than or equal to 50 mA. "F" indicates that the leakage current was less than 50 mA.
[3]"P" indicates that no voltage drop occurred and no mark of short circuit was present. "F" indicates that voltage drop occurred.
[4]A value relative to the discharge resistance of No. 1. The discharge resistance of No. 1 is defined as 100.

<Results>

In Table 1, when the puncture resistance of the negative electrode active material layer is more than or equal to 0.60 N/mm, it is observed that the detection sensitivity in the withstand voltage test tends to be improved (see, for example, No. 4 and No. 9).

In Table 1, when the thickness retention ratio of the porous resin layer is more than or equal to 91.8%, it is observed that the creep short circuit resistance tends to be improved (see, for example, No. 5 and No. 7).

In Table 1, when the thickness retention ratio of the porous resin layer is less than or equal to 93.0%, it is observed that the output tends to be improved (see, for example, No. 6 and No. 8).

The present embodiment and the present example are illustrative in any respects. The present embodiment and the present example are not restrictive. The scope of the present technology includes any modifications within the scope and meaning equivalent to the terms of the claims. For example, it is initially expected to extract freely configurations from the present embodiment and the present example and combine them freely.

What is claimed is:

1. A nonaqueous electrolyte secondary battery comprising:
   an electrode assembly; and
   an electrolyte solution, wherein
   the electrode assembly includes a laminated assembly,
   the laminated assembly includes a positive electrode plate, a negative electrode plate, and a separator,
   the separator separates the positive electrode plate and the negative electrode plate from each other,
   the separator includes a porous resin layer,
   the porous resin layer includes a polyolefin-based material,
   the negative electrode plate includes a negative electrode active material layer,
   the negative electrode active material layer includes negative electrode active material particles,
   the negative electrode active material layer is in direct contact with the porous resin layer,
   the negative electrode active material layer has a puncture resistance of more than or equal to 0.60 N/mm,
   the puncture resistance is calculated by the following formula (α):

$$Z=Y/X \quad \ldots \quad (\alpha),\text{ where}$$

Z represents the puncture resistance,
   Y represents maximum stress in a puncture test, and
   X represents displacement at a time at which the maximum stress is obtained, wherein the displacement is a distance which a needle will go through the negative electrode active material layer, and
   in the puncture test, the negative electrode active material layer is punctured with the needle having a tip radius of 10 μm at a rate of 10 μm/s in a direction perpendicular to a surface of the negative electrode active material layer, wherein
   the porous resin layer has a thickness retention ratio of 91.8% to 93.0%, and
   the thickness retention ratio is calculated by the following formula (β):

$$Tr=(T_1/T_0)\times 100 \quad (\beta),\text{ where}$$

Tr represents the thickness retention ratio,
   $T_0$ represents a thickness of the porous resin layer, and
   $T_1$ represents a thickness of the porous resin layer in a state in which the porous resin layer is compressed in a thickness direction by a pressure of 13.9 MPa and the pressure is then removed.

2. The nonaqueous electrolyte secondary battery according to claim 1, wherein the negative electrode active material particles have a median value of circularities of more than or equal to 0.60.

3. The nonaqueous electrolyte secondary battery according to claim 1, wherein
the porous resin layer includes a first layer, a second layer, and a third layer,
the first layer, the second layer, and the third layer are layered in a thickness direction of the porous resin layer,
the second layer is interposed between the first layer and the third layer,
each of the first layer and the third layer includes polypropylene,
the second layer includes polyethylene, and
the porous resin layer satisfies a relation of the following formula (γ):

$$t_2/\{(t_1+t_3)\times 0.5\} \leq 1.5 \qquad (\gamma),\text{ where}$$

$t_1$ represents a thickness of the first layer,
$t_2$ represents a thickness of the second layer, and
$t_3$ represents a thickness of the third layer.

4. The nonaqueous electrolyte secondary battery according to claim 1, wherein a ratio of a thickness of the negative electrode active material layer to a thickness of the laminated assembly is 0.35 to 0.45.

5. The nonaqueous electrolyte secondary battery according to claim 1, wherein in the electrode assembly, the number of layers of the positive electrode plate is 60 to 80.

6. The nonaqueous electrolyte secondary battery according to claim 1, wherein the porous resin layer has a thickness of 14 μm to 20 μm.

7. The nonaqueous electrolyte secondary battery according to claim 1, wherein the porous resin layer has a puncture strength of less than or equal to 3.92 N.

8. The nonaqueous electrolyte secondary battery according to claim 1, wherein the negative electrode active material layer has the puncture resistance of less than or equal to 0.85 N/mm.

9. The nonaqueous electrolyte secondary battery according to claim 2, wherein the negative electrode active material particles have the median value of circularities of less than or equal to 0.85.

10. A battery module comprising a plurality of single-cells, wherein
the plurality of single-cells are arranged side by side in an arrangement direction,
the arrangement direction is along a layering direction of the positive electrode plate, the negative electrode plate, and the separator in the electrode assembly,
each of the plurality of single-cells receives compression force along the arrangement direction, and
each of the plurality of single-cells is the nonaqueous electrolyte secondary battery according to claim 1.

11. The nonaqueous electrolyte secondary battery according to claim 1, wherein the negative electrode active material particles consist essentially of spheroidized natural graphite, and the negative electrode active material particles have a medium value of circularities of 0.60 to 0.85.

12. The nonaqueous electrolyte secondary batter according to claim 11, wherein the negative active material particles have a D50 of 10 μm to 12 μm.

* * * * *